(12) United States Patent
Saiki (10) Patent No.: US 11,873,620 B2
(45) Date of Patent: Jan. 16, 2024

(54) TURNING CONTROL APPARATUS FOR TURNING-TYPE WORKING MACHINE

(71) Applicant: KOBELCO CONSTRUCTION MACHINERY CO., LTD., Hiroshima (JP)

(72) Inventor: Seiji Saiki, Hiroshima (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 628 days.

(21) Appl. No.: 17/046,641

(22) PCT Filed: Mar. 25, 2019

(86) PCT No.: PCT/JP2019/012509
§ 371 (c)(1),
(2) Date: Oct. 9, 2020

(87) PCT Pub. No.: WO2019/208060
PCT Pub. Date: Oct. 31, 2019

(65) Prior Publication Data
US 2021/0180291 A1    Jun. 17, 2021

(30) Foreign Application Priority Data
Apr. 26, 2018 (JP) ................... 2018-085195

(51) Int. Cl.
*E02F 9/12* (2006.01)
*B66C 13/40* (2006.01)
(Continued)

(52) U.S. Cl.
CPC .............. *E02F 9/123* (2013.01); *B66C 13/40* (2013.01); *E02F 9/205* (2013.01); *E02F 9/26* (2013.01);
(Continued)

(58) Field of Classification Search
CPC ... E02F 3/32; E02F 9/123; E02F 9/205; E02F 9/2228; E02F 9/26; E02F 9/262;
(Continued)

(56) References Cited

U.S. PATENT DOCUMENTS 9,113,047 B2 * 8/2015 Onuma ..................... E02F 9/24
9,333,915 B2 * 5/2016 Nakanishi ................. E02F 9/24
(Continued)

FOREIGN PATENT DOCUMENTS

EP    2 624 552 A1    8/2013
EP    2 924 182 A2    9/2015
(Continued)

OTHER PUBLICATIONS

Extended European Search Report dated Jul. 19, 2021 in European Patent Application No. 19791738.8, 5 pages.
(Continued)

*Primary Examiner* — Tyler J Lee
(74) *Attorney, Agent, or Firm* — Oblon, McClelland, Maier & Neustadt, L.L.P.

(57) ABSTRACT

A turning control apparatus, for a turning-type working machine, includes: a target stop position setting unit setting the target stop position of the turning body and a turning command unit. The target stop position setting unit includes an image taking device, an image processing device forming an overhead view image of the work machine and surrounding objects based on the taken image; an image display command unit making a target stop position setting image including the overhead view image be displayed on a display screen of the image display device, a setting operation member to which a position setting operation for setting a target stop position with reference to the position of the image of the work machine and surrounding objects included in the overhead view image is applied, and a target (Continued)

stop position determination unit that determines a target stop position based on the position setting operation.

10 Claims, 7 Drawing Sheets

(51) Int. Cl.
    *E02F 9/26*           (2006.01)
    *B66C 23/86*         (2006.01)
    *E02F 3/32*           (2006.01)
    *H04N 7/18*           (2006.01)
    *E02F 9/20*           (2006.01)
    *E02F 9/22*           (2006.01)

(52) U.S. Cl.
    CPC ................. *B66C 23/86* (2013.01); *E02F 3/32* (2013.01); *E02F 9/2228* (2013.01); *H04N 7/18* (2013.01)

(58) Field of Classification Search
    CPC .......... B66C 13/40; B66C 23/86; H04N 7/18; H04N 7/181
    See application file for complete search history.

(56) References Cited

U.S. PATENT DOCUMENTS

| | | | | |
|---|---|---|---|---|
| 10,920,403 | B2* | 2/2021 | Izumikawa | ............. B60R 11/02 |
| 11,365,527 | B2* | 6/2022 | Kiyota | ...................... B60R 1/00 |
| 2013/0088593 | A1* | 4/2013 | Ishimoto | ................. E02F 9/261 |
| | | | | 348/143 |
| 2013/0144492 | A1 | 6/2013 | Takano et al. | |
| 2013/0182066 | A1* | 7/2013 | Ishimoto | ................. E02F 9/261 |
| | | | | 348/38 |
| 2013/0222573 | A1* | 8/2013 | Onuma | ..................... G05B 9/02 |
| | | | | 348/82 |
| 2017/0284069 | A1* | 10/2017 | Machida | ................... B60R 1/00 |
| 2017/0298595 | A1* | 10/2017 | Machida | ................. H04N 23/90 |
| 2017/0305018 | A1* | 10/2017 | Machida | ................ H04N 7/181 |
| 2018/0027179 | A1 | 1/2018 | Matsuzaki et al. | |
| 2018/0347151 | A1* | 12/2018 | Tsukamoto | ........... E02F 9/2282 |
| 2019/0179315 | A1 | 6/2019 | Marukawa et al. | |

FOREIGN PATENT DOCUMENTS

| | | |
|---|---|---|
| JP | 60-37339 A | 2/1985 |
| JP | 2007-147588 A | 6/2007 |
| JP | 2017-46277 A | 3/2017 |
| JP | 2017-66860 A | 4/2017 |
| JP | 2018-14554 A | 1/2018 |
| JP | 2018-39477 A | 3/2018 |
| WO | WO 2011/155464 A1 | 12/2011 |
| WO | WO 2018/037950 A1 | 3/2018 |

OTHER PUBLICATIONS

International Search Report dated May 21, 2019 in PCT/JP2019/012509 filed on Mar. 25, 2019, 2 pages.

* cited by examiner

TURNING CONTROL APPARATUS FOR TURNING-TYPE WORKING MACHINE

TECHNICAL FIELD

The present invention relates to an apparatus for controlling the turning motion of a turning body of a turning-type working machine.

BACKGROUND ART

A turning-type working machine, such as a hydraulic excavator or a turning type crane, includes a turning body (e.g., an upper turning body), a support body that supports the turning body (e.g., a lower travelling body), and a turning drive device that turns the turning body. In such a turning-type working machine, the turning drive device is generally activated such that the turning body performs a turning motion in response to a turning operation applied to a turning operation lever by an operator.

Furthermore, Patent Document 1, for the purpose of reducing the burden on the operator, an apparatus is disclosed for performing control to automatically stop the turning body in the turning-type working machine to a preset target stop position. Specifically, Patent Document 1 discloses a control apparatus for automatically moving the excavation work arm from a first set position set in advance in a teaching mode to a second set position in a turning type excavation work vehicle having an excavation work arm including a boom, an arm, and a bucket. In the teaching mode, performed is an artificial movement operation of actually and manually moving the excavating work arm so as to prevent the excavating work arm from colliding with a nearby structure or the like. The control device stores a movement start position and a movement end position of the excavation work arm by the artificial movement operation as first and second set positions, respectively, and executes a control to reproduce the artificial movement operation. The control includes a turning automatic stop control such as automatically stopping the turning of the excavation work arm at the second set position.

However, in the apparatus described in Patent Document 1, the operator has to perform an artificial movement operation of actually moving the turning body and accurately stopping it at a position corresponding to the target stop position in the teaching mode in order to set the target stop position (second setting position in the document). Such an operation is not easy and requires skill. Besides, stopping the turning body accurately at the target stop position regardless of the large moment of inertia of the turning body requires moving the turning body at a very low speed, which involves a significant decrease in work efficiency. Although, in recent years, a system has been developed which allows an operator to perform a remote operation of turning the working machine in an operator seat away from the working machine while watching an image taken by the camera mounted on the working machine without actually boarding the working machine, it is difficult in such a system to accurately set a target stop position while watching the image of the camera.

CITATION LIST

Patent Literature

Patent Literature 1: Japanese Unexamined Patent Publication No. Sho 60-37339

SUMMARY OF INVENTION

It is an object of the present invention to provide a turning control apparatus being capable of automatically stopping a turning body in a turning-type working machine at a target stop position and allowing the target stop position to be accurately and easily set.

Provided is a turning control apparatus for controlling driving of a turning body in a working machine that includes the turning body, a support body that supports the turning body turnably, and a turning drive device that turns the turning body, the turning control apparatus comprising: a target stop position setting unit that sets a target stop position, which is a position at which the turning of the turning body is to be stopped; and a turning command unit that provides an automatic stop command for automatically stopping the turning body at the target stop position to the turning drive device. The target stop position setting unit includes: an image taking device that is mounted on the working machine and takes an image of the working machine and surroundings thereof; an image processing device that forms an overhead view image of the working machine and a surrounding object positioned around the working machine based on the image taken by the image taking device; an image display device including a display screen capable of displaying the overhead view image; an image display command unit that makes the display screen display a target stop position setting image including the overhead view image; a setting operation member to which a position setting operation for setting the target stop position based on the position of the image of the working machine and the surrounding object included in the overhead view image is applied; and a target stop position determination unit that determines the target stop position based on the position setting operation.

DESCRIPTION OF EMBODIMENTS

Hereinafter, preferred embodiments of the present invention will be described with reference to the drawings.

Figure 1:
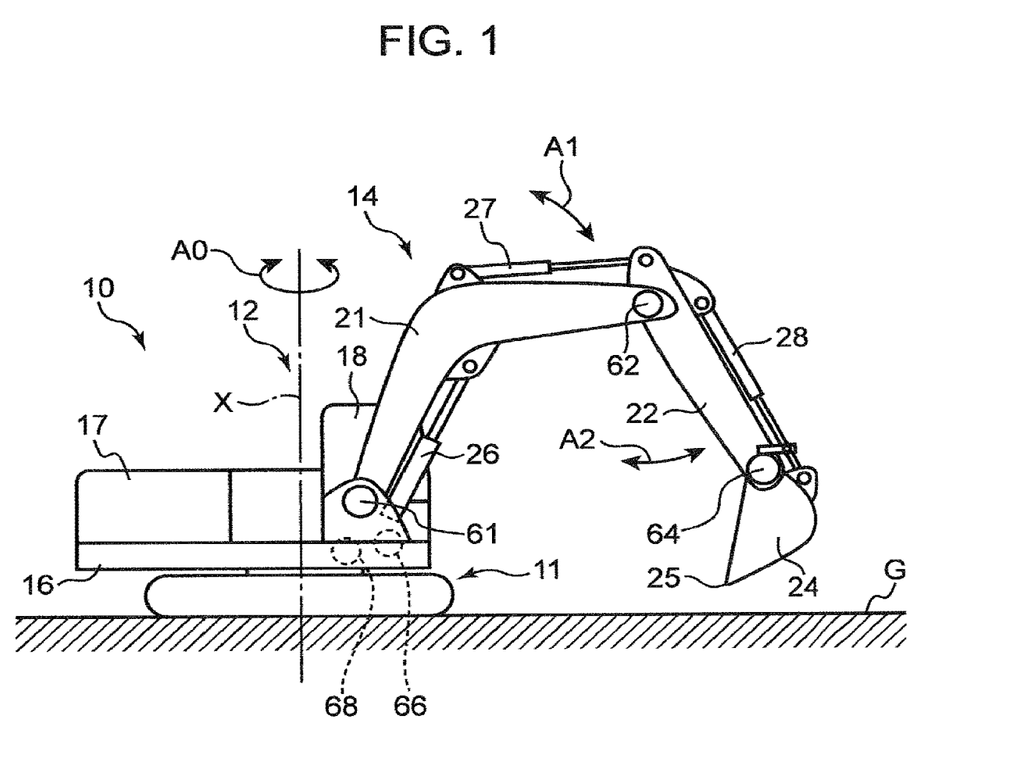
FIG. 1 is a side view showing a hydraulic excavator that is an example of a turning-type working machine to which a turning control apparatus according to an embodiment of the present invention is applied.

FIG. 1 shows a hydraulic excavator 10 which is an example of a turning-type working machine to which a turning control apparatus according to the embodiment of the present invention is applied. The turning-type working machine to which the present invention is applied is not limited to a hydraulic excavator. The present invention can be widely applied to a turning working machine comprising a turning body, a support body that supports the turning body, and a turning body driving device that turns the turning body. The turning-type working machine may be, for example, a mobile dismantling machine or a mobile or fixed crane.

The hydraulic excavator 10 shown in FIG. 1 includes a lower travelling body 11, an upper turning body 12 which is supported on the lower travelling body 11 turnably about the vertical axis X as indicated by the arrow A0, a working device 14 mounted on the upper turning body 12, and a hydraulic driving device. The upper turning body 12 and the working device 14 constitute a turning body, while the lower travelling body 11 constitutes a support body that supports the turning body turnably.

The lower travelling body 11 is capable of travelling on the ground G. The upper turning body 12 includes a turning frame 16 and a plurality of turning body elements mounted thereon. The plurality of turning body elements include an engine room 17 that houses the engine and a cab 18 that defines an operation room.

The working device 14 is capable of performing motions for excavation work and other necessary work, including a boom 21, an arm 22, a bucket 24 and a plurality of working hydraulic cylinders. The boom 21 has a proximal end which is supported so as to be raisable and lowerable, that is, rotatably about a horizontal axis as indicated by an arrow A1, on the front end of the turning frame 16, and a distal end opposite to the proximal end. The arm 22 has a proximal end portion which is mounted on the distal end portion of the boom 21 rotatably about a horizontal axis as shown by an arrow A2, and a distal end portion opposite thereto. The bucket 24, which corresponds to a tip attachment, is rotatably attached to the distal end portion of the arm 22. The plurality of working hydraulic cylinders include a boom cylinder 26 that raises and lowers the boom 21, an arm cylinder 27 that rotationally moves the arm 22 relatively to the boom 21, and a bucket cylinder 28 that rotationally moves the bucket 24 relatively to the arm 22.

The hydraulic driving device includes a section for hydraulically turning the upper turning body 12 and a section for hydraulically actuating the working device 14 to make it perform a work motion. The former constitutes a turning drive device 30 shown in FIG. 2. The turning drive device 30 includes a hydraulic pump 31, a turning motor 32, a turning control valve 34, a turning operation device 36, and a pilot hydraulic source 38.

Figure 2:
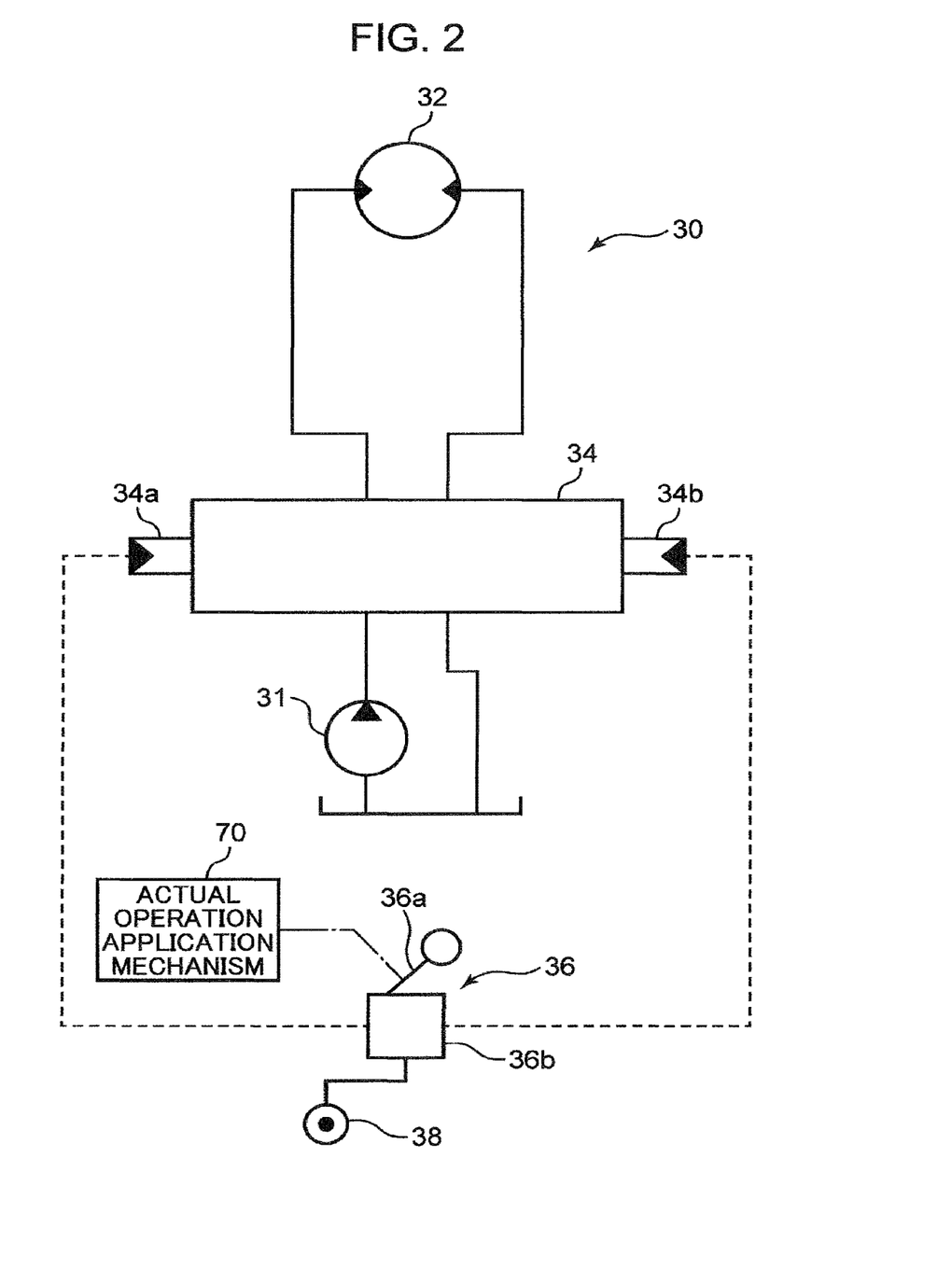
FIG. 2 is a diagram showing a real machine turning operation device and a turning hydraulic circuit mounted on the hydraulic excavator.

The hydraulic pump 31 is driven by a drive source such as an engine to discharge hydraulic oil to be supplied to the turning motor 32. The turning motor 32 in this embodiment is a hydraulic motor capable of being operated to turn the upper turning body 12 in both directions by hydraulic fluid supplied to the hydraulic motor.

The turning control valve 34 is a pilot operated direction selector valve capable of being opened and closed to change the direction in which hydraulic oil is supplied from the hydraulic pump 31 to the turning motor 32 and the flow rate of the hydraulic oil. Specifically, the turning control valve 34 has a left turning pilot port 34a and a right turning pilot port 34b, being configured to be opened by the pilot pressure supplied to any of the pilot ports 34a and 34b so as to allow hydraulic oil to be supplied from the hydraulic pump 31 to the turning motor 32 at a flow rate corresponding to the magnitude of the pilot pressure and in a direction corresponding to the pilot port to which the pilot pressure is supplied.

The turning operation device 36 allows an actual turning operation to be applied to the turning operation device 36 in the hydraulic excavator 10, and operates the turning control valve 34 to cause the turning driving of the upper turning body 12 corresponding to the actual turning motion to be performed. Specifically, the turning operation device 36 includes an actual machine turning operation lever 36a, and a turning pilot valve 36b linked to the actual machine turning operation lever 36a. The actual machine turning operation lever 36a is included in a plurality of actual machine operation levers provided in the operation room defined by the cab 18, being an actual machine operation member to which an actual turning operation of rotationally moving the actual machine turning operation lever 36a leftward or rightward from the neutral position thereof. The turning pilot valve 36b is opened so as to allow pilot pressure having a magnitude corresponding to the magnitude of the actual turning operation to be supplied from the pilot hydraulic source 38 to the turning pilot port that is one of the left and right turning pilot ports 34a, 34b of the turning control valve 34 and corresponds to the direction of the actual turning operation.

Figure 3:
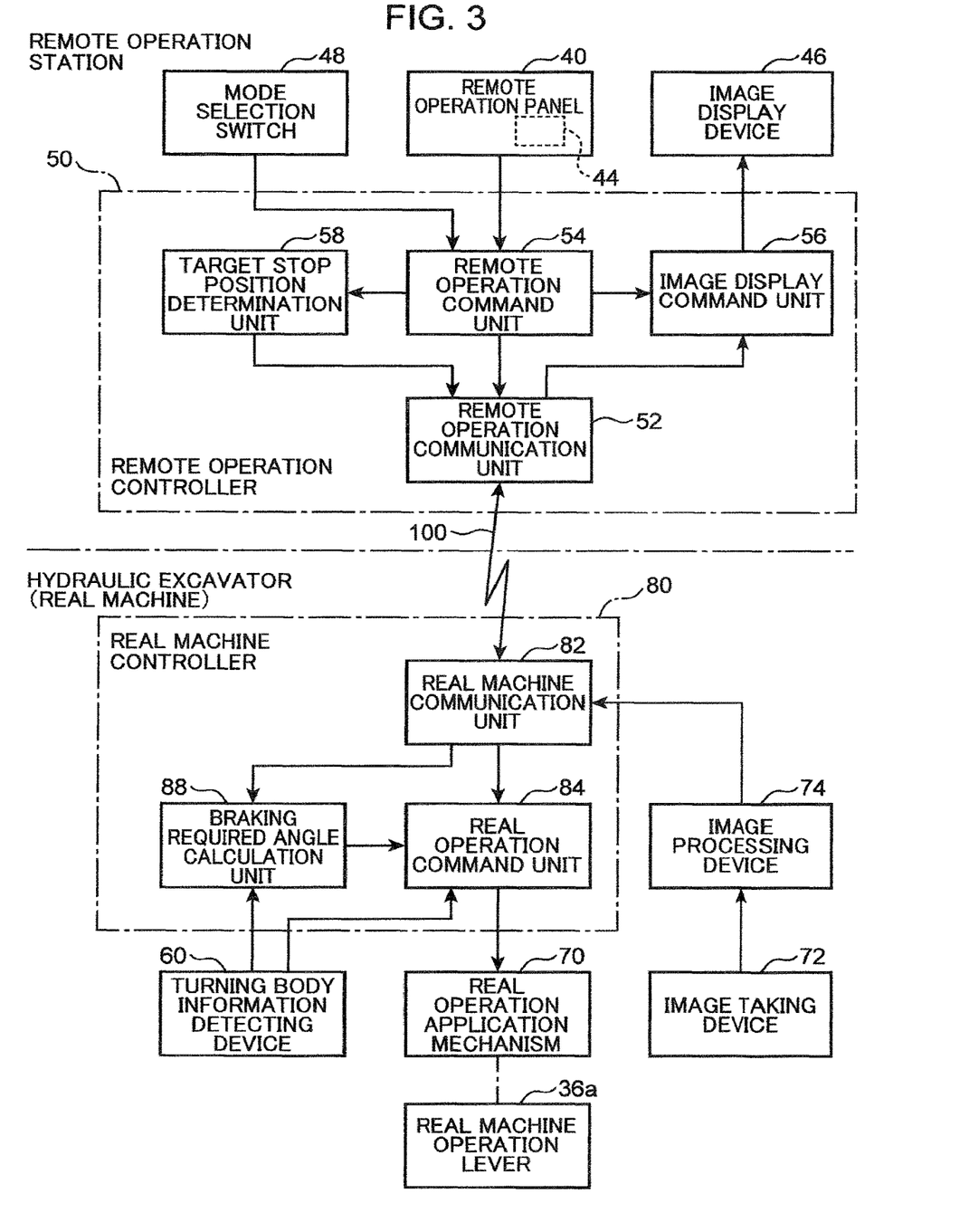
FIG. 3 is a block diagram showing main components of the turning control apparatus mounted on the hydraulic excavator.

FIG. 3 is a block diagram showing components of the turning control apparatus according to this embodiment. The operation of the hydraulic excavator 10 according to this embodiment is performed by use of a remote operation system. According to the remote operation system, the hydraulic excavator 10 is actuated by a remote operation by an operator at a remote operation station away from the hydraulic excavator 10 that is an actual machine.

The components of the turning control apparatus are divided into a plurality of remote-operation side elements provided in the remote operation station and a plurality of actual-machine side elements mounted on the actual machine. In this embodiment, the plurality of remote-operation side elements include a remote turning operation lever 44 included in a remote operation panel 40, an image display device 46, a mode selection switch 48, and a remote operation controller 50. The plurality of actual-machine side elements include a turning body information detecting device 60, an actual operation application mechanism 70, an image taking device 72, an image processing device 74, and an actual machine controller 80.

The remote operation panel 40 includes a plurality of remote operation levers to which an operator applies respective operations for remote operation as to the travel of the lower travelling body 11, the turning of the upper turning body 12, and the motion of the working device 14, and an operation signal output unit that outputs respective remote operation signals corresponding to the operations applied to the plurality of remote operation levers, respectively. The remote turning operation lever 44 is included in the plurality of remote operation levers. The remote turning operation lever 44 is a remote operation member to which a remote turning operation for turning the upper turning body 12 is applied.

The image display device 46 includes a display screen capable of displaying a predetermined image. The image display device 46 is provided at a position in the vicinity of the remote operation panel 40, specifically, at a position where an operator who is operating the remote operation lever included in the remote operation panel 40 in the remote operation station can visually recognize the display screen.

The mode selection switch 48 allows a mode selection operation (ON/OFF operation in this embodiment) for the operator to select a mode of the remote operation controller 50 to be applied to the mode selection switch 48, and inputs a mode designation signal corresponding to the mode selection operation to the remote operation controller 50. The remote operation controller 50 has a plurality of modes, from which a predetermined mode is designated by the mode designation signal. The plurality of modes include a remote operation mode and a target stop position setting mode.

The remote operation controller 50 is composed of a microcomputer or the like, being electrically connected to the remote operation panel 40, the image display device 46, and the mode selection switch 48. The remote operation controller 50 includes, as a function for constituting the turning control apparatus, a remote operation communication unit 52, a remote operation command unit 54, an image display command unit 56 and a target stop position determination unit 58.

The remote operation communication unit 52 has a function of transmitting and receiving necessary signals to and from the actual machine controller 80 through a predetermined communication path 100. The communication path 100 may be either a wireless communication path, for example, a specified power ministry wireless, blue suit (registered trademark), a mobile phone communication network, a public communication line including an Internet communication network, or a wire communication path through a long cable.

The remote operation command unit 54 receives an input of a remote operation signal from the remote operation panel 40 (including a remote turning operation signal), and is switched between the remote operation mode and the target stop position setting mode by the mode command signal input from the mode selection switch 48.

In the remote operation mode, the remote operation command unit 54, regarding each of the remote operation signals input from the remote operation panel 40 as a signal corresponding to a remote operation (including a remote turning operation), inputs a remote operation command corresponding to the operation signal (including a remote turning operation command corresponding to the turning operation signal) to the actual machine controller 80 through the remote operation communication unit 52 and the communication path 100. The remote operation command unit 54, thus, regards the operation applied to the remote turning operation lever 44 as a remote turning operation to output a remote turning operation command corresponding thereto.

On the other hand, in the target stop position setting mode, the remote operation command unit 54 inputs an image display command to the image display command unit 56 so as to cause the image display command unit 56 to make the image display device 46 display a predetermined target stop position setting image. Besides, the remote operation command unit 54, in the target stop position setting mode, regards the operation applied to the remote turning operation lever 44 of the remote operation panel 40 as a position setting operation for setting the target stop position, and inputs the operation signal input from the remote operation panel 40 correspondingly to the operation to the target stop position determination unit 58 as (not a signal corresponding to the remote operation but) a signal corresponding to the position setting operation. The remote operation communication unit 52, therefore, transmits no remote operation command to the actual machine controller 80 in the target stop position setting mode.

In the target stop position determination mode, the target stop position determination unit 58 determines a target stop position based on the signal input from the remote operation command unit 54 (a signal corresponding to the position setting operation), and transmits a target stop position command specifying the target stop position to the actual machine controller 80 through the remote operation communication unit 52. The target stop position is a position with respect to the turning direction of the upper turning body 12, being a position at which the upper turning body 12 is to be automatically stopped. The purpose of setting the target stop position is not limited. For example, the target stop position may be set before an obstacle present around the hydraulic excavator 10 to prevent the obstacle from interfering with the upper turning body 12 or the working device 14. Alternatively, the target stop position may be set just above a carrier such as a dump truck in order to load earth and sand onto the carrier.

The image display command unit 56 receives image data from the actual machine controller 80 through the remote operation communication unit 52, and makes the image display device 46 display a target stop position setting image by use of the image data. The target stop position setting image is an image for allowing the operator to apply the position setting operation to the remote turning operation lever 44 while viewing the target stop position setting images to thereby set the target stop position; the details will be described later. The image display command unit 56 according to this embodiment also receives data of a remote operation allowing image that is necessary for the operator to perform a remote operation and makes the image display device 46 display also the remote operation allowing image.

The turning body information detecting device 60 detects information that is necessary for automatically stopping the upper turning body 12 at the target stop position and is the turning body information about the moment of inertia and the turning motion of the turning body. The turning body information according to this embodiment includes the attitude of the working device 14, the turning angle and the turning angular velocity of the upper turning body 12, and the weight of the earth and sand loaded on the bucket 24. Specifically, the turning body information detecting device 60 includes a plurality of sensors as shown in FIG. 1, namely, a boom angle sensor 61 for detecting the derrick angle of the boom 21, an arm angle sensor 62 for detecting the angle of the arm 22 to the boom 21, a bucket angle sensor 64 for detecting the angle of the bucket 24 to the arm 22, a turning angle sensor 66 for detecting the turning angle of the upper turning body 12 to the lower travelling body 11, and a boom pressure sensor 68 for detecting the head pressure of the boom cylinder 26, the head pressure being increased or decreased depending on the weight of the earth and sand in the bucket 24. The turning angular velocity can be obtained by the time differential calculation of the turning angle detected by the turning angle sensor 66. The calculation may be performed by either the turning angle sensor 66 or the actual machine controller 80. Alternatively, there may be provided a turning speed sensor for detecting the turning angular velocity separately from the turning angle sensor 66.

The actual operation application mechanism 70 is mounted on the operation seat in the cab 18 so as to apply the actual turning operation, in place of an operator, to the actual machine turning operation lever 36*a*. The actual operation application mechanism 70 is mechanically coupled to the actual machine turning operation lever 36*a* so as to be able to apply the actual turning operation to the actual machine turning operation lever 36*a* (i.e., so as to rotationally move the actual machine turning operation lever 36a in either right or left direction).

The image taking device 72 takes an image of the hydraulic excavator 10 and surroundings thereof. The image taking device 72 is constituted by, for example, a plurality of cameras mounted on the upper turning body 12 or the lower travelling body 11 at a plurality of locations, the plurality of cameras configured to take images of the hydraulic excavator 10 and the surrounding therearound at different angles.

The image processing device 74 creates an overhead view image in which the hydraulic excavator 10 and the surrounding objects are viewed from above, on the basis of an image taken by the image taking device 72. The overhead view image is an image to be the basis of the target stop position setting image as described later. The image processing device 74 according to this embodiment also creates an image necessary for the operator to perform remote operation of the hydraulic excavator 10 at the remote operation station, namely, a remote operation allowing image viewed from the operator's seat in the cab 18. The remote operation allowing image may be created either by utilization of the image taken by the image taking device 72 or by use of a dedicated camera. The image processing device 74 inputs the data of the created image to the actual machine controller 80.

The actual machine controller 80 is composed of a microcomputer or the like, similarly to the remote operation controller 50, being electrically connected to the turning body information detecting device 60, the actual operation application mechanism 70 and the image processing device 74. The actual machine controller 80 includes, as functions for constituting the turning control apparatus, an actual machine communication unit 82, an actual operation command unit 84, and a braking required angle calculation unit 88.

The actual machine communication unit 82 has a function of transmitting and receiving necessary signals to and from the remote operation communication unit 52 of the remote operation controller 50 through the communication path 100. Specifically, the actual machine communication unit 82 transmits image data input from the image processing device 74 to the image display command unit 56 through the remote operation communication unit 52, while receives a remote command and a target stop position command transmitted from the remote operation command unit 54 and the target stop position determination unit 58 through the remote operation communication unit 52, respectively, to input the remote command and the target stop position command to the actual operation command unit 84 and the braking required angle calculation unit 88.

The actual operation command unit 84 executes a remote operation control in principle. Specifically, based on the remote command transmitted from the remote operation command unit 54 through the remote operation communication unit 52 and the actual machine communication unit 82 (that is, the command corresponding to the remote operation applied to each of the remote operation levers of the remote operation panel 40), the actual operation command unit 84 inputs actual operation commands to the actual operation application mechanism 70 so as to make the actual operation application mechanism 70 apply the actual operation corresponding to the remote command to each actual machine operation lever. The actual operation commands include, in addition to the actual turning operation command corresponding to the remote turning operation applied to the remote turning operation lever 44, respective actual operation commands for making the working device 14 perform the work motion and making the lower travelling body 11 perform the travelling motion.

The braking required angle calculation unit 88, when the target stop position command from the actual machine communication unit 82 is input thereto, calculates a braking required angle θb of the turning body including the upper turning body 12 and the working device 14. The braking required angle θb is a turning angle required for bringing the upper turning body 12 and the working device 14 which are currently turning into a stopping state at a non-excessive deceleration. The braking required angle θb can be calculated in real time based on the turning body information, that is, the information on the moment of inertia and the turning state (the turning angle and the turning angular velocity) of the turning body.

The actual operation command unit 84, when the target stop position command is input to the actual operation command unit 84, that is, when the target stop position is determined, executes the automatic stop control based on the target stop position in preference to the remote operation control. Specifically, the actual operation command unit 84 calculates a remaining angle θr, which is the turning angle from the current turning position to the target stop position, and when the remaining angle θr is equal to or less than the braking required angle θb, the actual operation command unit 84 inputs an actual turning operation command for automatic stopping to stop the upper turning body 12 and the working device 14 that are turning, at the target stop position, regardless of the presence or absence of a remote turning operation command sent from the remote operation command unit 54.

Figure 4:
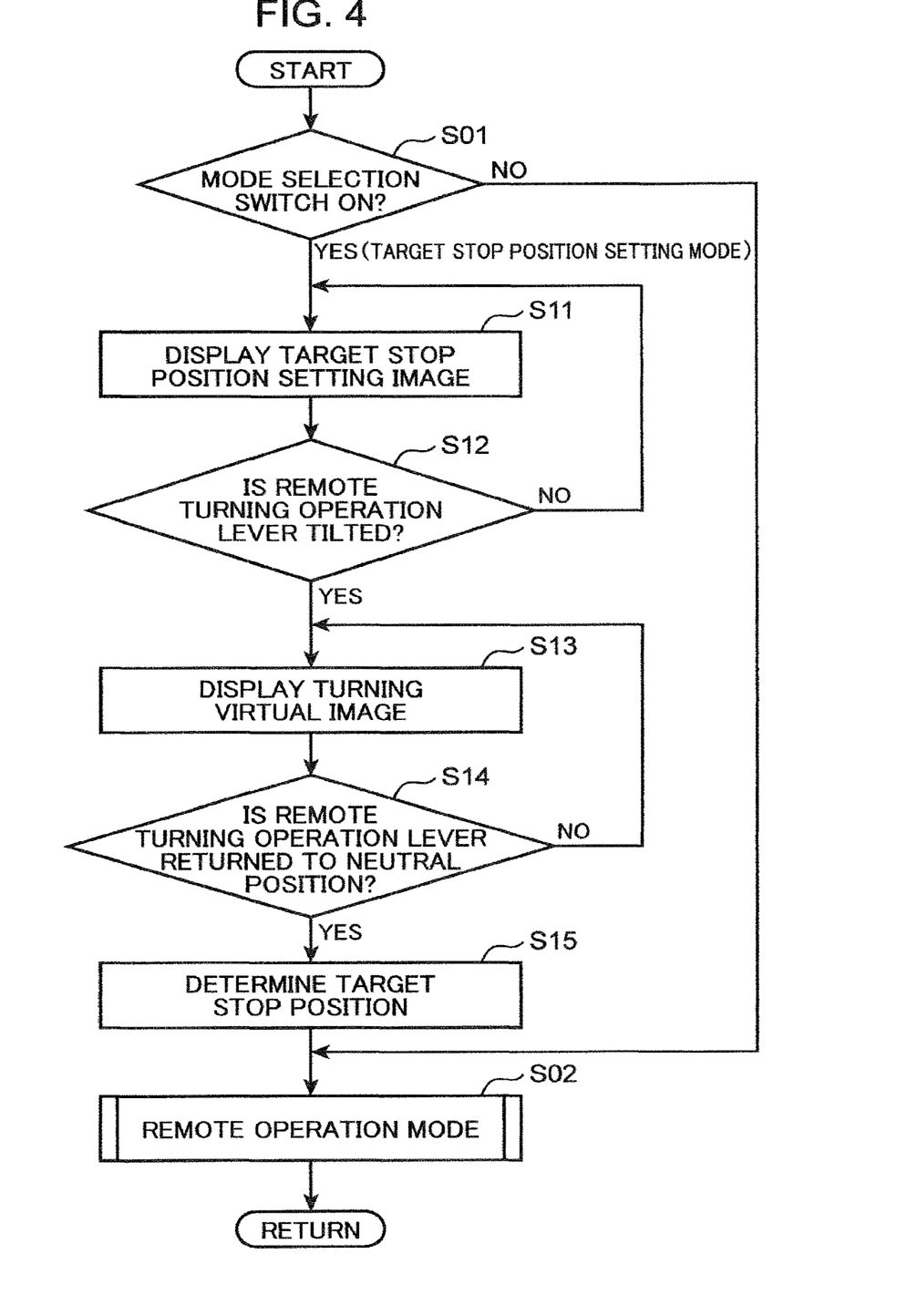
FIG. 4 is a flowchart showing an arithmetic control operation performed by the turning control apparatus mainly in the target stop position setting mode.

Next will be described specific arithmetic control operations performed by the aforementioned turning control device with reference to FIGS. 4 to 7. FIG. 4 is a flowchart mainly showing an arithmetic control operation performed in the target stop position setting mode among the arithmetic control operations, and FIG. 6 is a flowchart showing an arithmetic control operation performed in the remote operation mode.

The remote operation command unit 54 of the remote operation controller 50 according to this embodiment is switched between the remote operation mode and the target stop position setting mode by the on-off of the mode selection switch 48. Specifically, when the mode selection switch 48 is off (NO in step S01), the remote operation command unit 54 maintains the remote operation mode (step S02), and when the mode selection switch 48 is on (YES in step S01), the remote operation command unit 54 is switched to the target stop position setting mode.

In the target stop position setting mode, the remote operation command unit 54 inputs an image display command to the image display command unit 56. This causes the image display command unit 56 to make the image display device 46 display the target stop position setting image based on the image data transmitted from the image processing device 74 mounted on the actual machine (the hydraulic excavator 10 in this embodiment) through the actual machine communication unit 82, the remote operation communication unit 52, and the remote operation command unit 54, namely, the data on the overhead view image (step S11).

Figure 5:
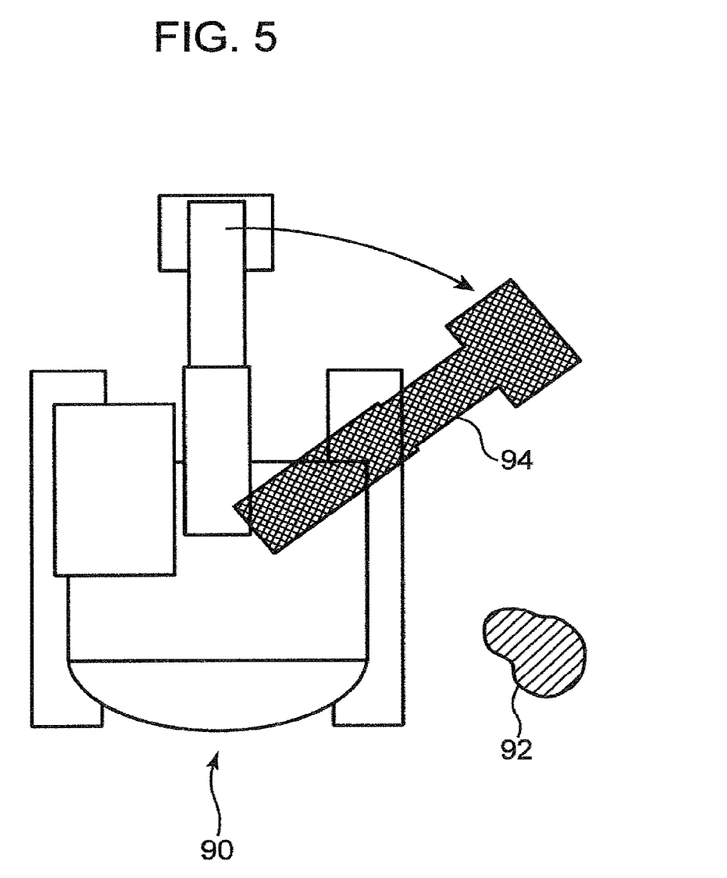
FIG. 5 is a diagram showing a target stop position setting image displayed in the target stop position setting mode.
Figure 6:
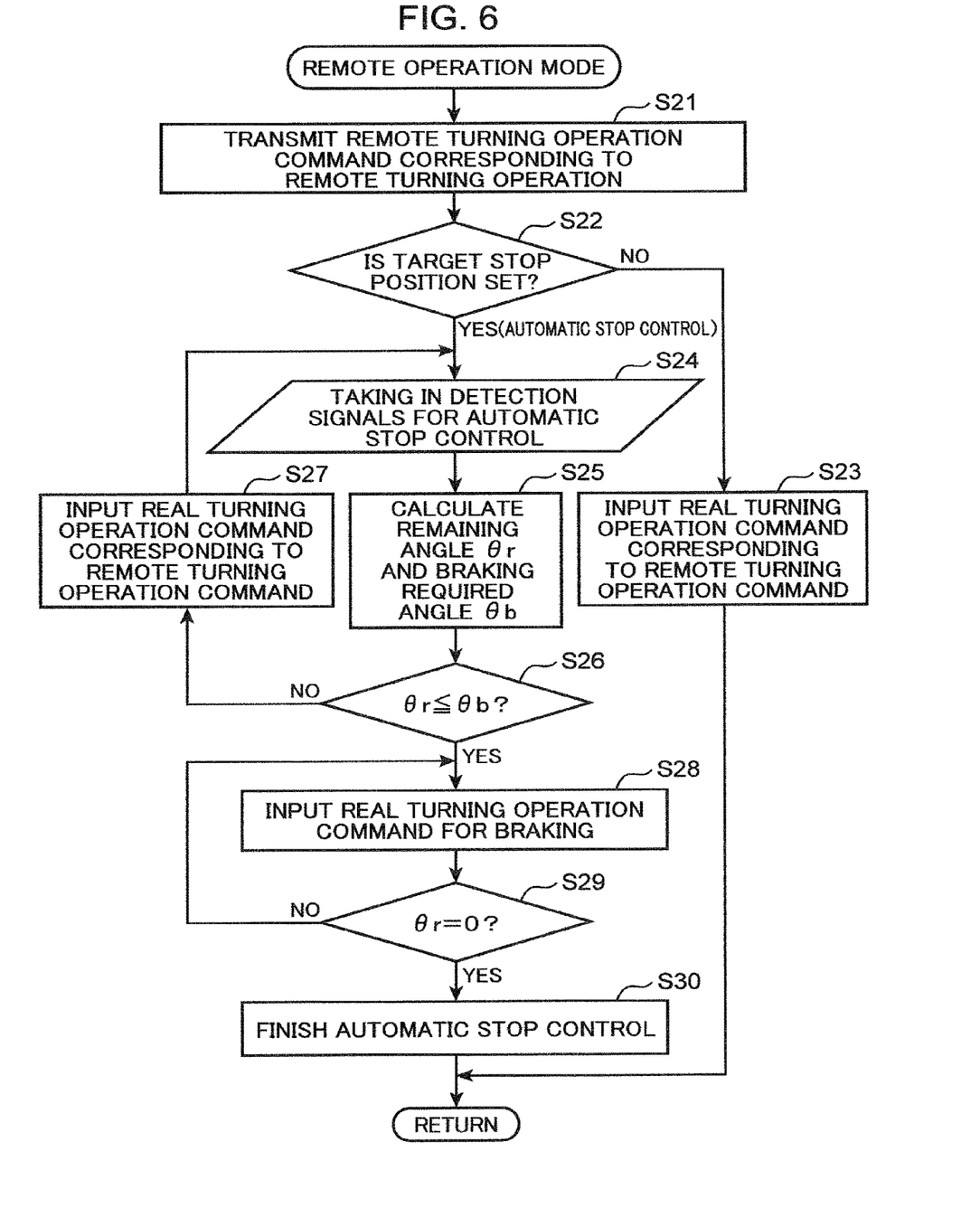
FIG. 6 is a flowchart showing an arithmetic control operation performed by the turning control device in the remote operation mode.

FIG. 5 shows an example of the target stop position setting image. The target stop position setting image is based on the overhead view image, specifically, the real machine image 90 in which the hydraulic excavator 10 is viewed down from a position just above the hydraulic excavator 10 and the surrounding object image 92 in which an object present around the image is viewed down, and further includes a turning virtual image 94. The turning virtual image 94 is an image displayed so as to perform the same turning motion as the turning motion of the turning body simulating the whole or a part of the turning body (the working device 14 in FIG. 5).

At the remote operation station, an operator can set the target stop position easily by applying an operation to the remote turning operation lever 44 of the remote operation panel 40 installed in the remote operation station with reference to the turning start of the turning virtual image 94 and the turning virtual image 94.

First, when the operation of tilting the remote turning operation lever 44 either rightward or leftward from the neutral position thereof, namely, a turning start operation, is applied to the remote turning operation lever 44 by the operator (YES in step S12), the remote operation command unit 54 sends a command to the image display command unit 56 so as to start the turning of the turning virtual image 94 on the target stop position setting image (step S13). The direction of the turning of the turning virtual image 94 preferably matches the direction of the operation applied to the remote turning operation lever 44. This makes it possible to provide a target stop position image adapted to the operation sense of the operator.

After the start of the turning of the turning virtual image 94, when the neutral position returning operation of returning the remote turning operation lever 44 to the neutral position again is applied to the remote turning operation lever 44 (YES in step S14), the target stop position determination unit 58 of the remote operation controller 50 determines the target stop position based on the position of the turning virtual image 94 with respect to the turning direction at the time of the application of the neutral position returning operation (step S15). This allows the operator to set the target stop position easily, accurately, and safely without the necessity of turning the turning body of the actual machine, by applying the neutral position returning operation to the remote turning operation lever 44 at an appropriate timing while confirming the relative positional relationship between the turning virtual image 94 and the surrounding object image 92.

The target stop position determination unit 58 transmits a target stop position command, which is a command for the determined target stop position, to the actual machine communication unit 82 of the actual machine controller 80 through the remote operation communication unit 52 and the communication path 100. This causes the target stop position setting mode to be terminated and causes the mode of the remote operation command unit 54 to be automatically switched to the remote operation mode (step S02).

In the remote operation mode, the remote operation command unit 54 regards the operation applied to the remote turning operation lever 44 as a remote turning operation, and transmits the remote turning operation command corresponding to the remote turning operation to the actual operation command unit 84 through the remote operation communication unit 52, the communication path 100, and the communication unit 82 (step S21 in FIG. 6).

The actual operation command unit 84 judges whether or not the target stop position is set (step S22). If the target stop position is not set (NO in step S22), the actual operation command unit 84 inputs the actual turning operation command for realizing the normal remote operation to the actual operation application mechanism 70. Specifically, the actual turning operation command corresponding to the remote turning operation command is input to the actual operation application mechanism 70 (step S23). The actual operation application mechanism 70, having received the input of the actual turning operation command, applies the actual operation to the actual machine turning operation lever 36a of the actual hydraulic excavator 10 so as to make the upper turning body 12 perform the turning motion corresponding to the remote turning operation command. In short, the actual machine turning operation lever 36a is actually rotationally moved. Besides, when the actual operation command other than the actual turning operation command (e.g., boom raising command) is input, the actual operation application mechanism 70 applies the actual operation corresponding to the actual operation command also to the other actual operation lever (e.g., boom lever).

On the other hand, when the target stop position is set (YES in step S22), the actual operation command unit 84 takes in a detection signal for the turning automatic stop control, specifically, the detection signal for the turning body information input from the turning body information detecting device 60 to the actual machine controller 80, at every predetermined control period (step S24). Furthermore, the actual operation command unit 84 and the braking required angle calculation unit 88 perform the calculation of the remaining angle θr and the braking required angle θb in real time, respectively (step S25).

Figure 7:
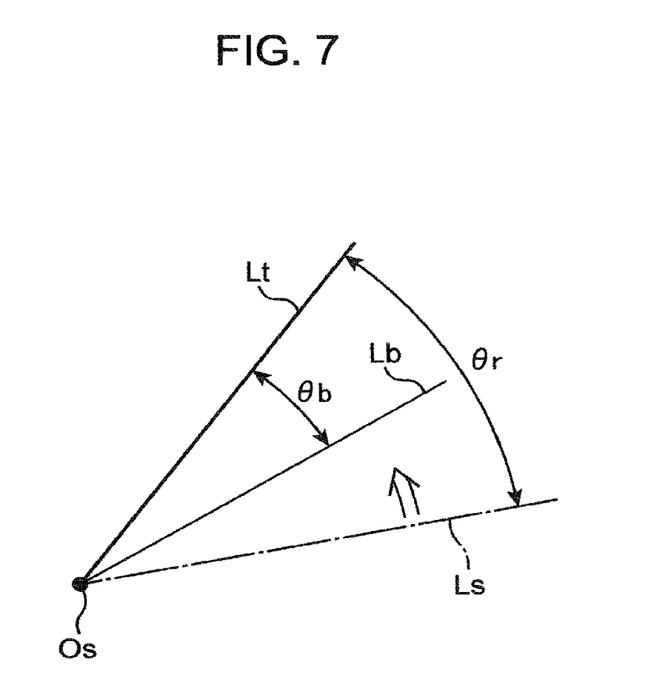
FIG. 7 is a diagram showing the relationship between a braking required angle and a remaining angle, the relationship being calculated in the remote operation mode.

FIG. 7 is a diagram showing the relationship between the remaining angle Or and the braking required angle θb. FIG. 7 shows a plurality of straight lines extending in the turning radial direction from the turning center Os, which include an one-dot chain line Ls indicating the current turning position, a thick solid line Lt indicating the target stop position, a thin solid line Lb indicating the braking start position at which the braking is to be started for safely stopping the upper turning body 12 at the target stop position. The remaining angle Or is an angle formed between the one-dot chain line Ls and the solid line Lt, i.e., the turning angle from the current turning position to the target stop position. The braking required angle Ob is an angle formed between the solid line Lb and the solid line Lt, i.e., the angle from the braking start position to the target stop position.

While the remaining angle θr is larger than the braking required angle θb as shown in FIG. 7 (NO in step S26), the actual operation command unit 84 inputs an actual turning operation command for realizing normal remote operation, that is, an actual turning operation command corresponding to the remote turning operation command sent from the remote operation command unit 54, to the actual operation application mechanism 70 (step S27), as in the case where the target stop position is not set. However, from the time when the remaining angle θr becomes equal to or less than the braking required angle θb (YES in step S26), in other words, from the time when the current turning position of the turning body reaches the braking start position, the actual operation command unit 84 inputs to the actual operation application mechanism 70 an actual turning operation command for braking such as to stop the upper turning body 12 safely and accurately at the target stop position at a predetermined deceleration, regardless of the remote turning operation command (step S28). Thus, the automatic stop control based on the target stop position is executed in preference to the normal remote operation. Thereafter, at the time when the remaining angle θr becomes 0, i.e., at the time when the upper turning body 12 reaches the target stop position to be stopped (YES in step S29), the automatic stop control is finished (step S30).

The target stop position of the turning body is, thus, set easily, accurately, and safely with no necessity of real turning motion of the turning body, and the automatic stop control based on the target stop position is executed.

The present invention is not limited to the embodiments described above. The present invention encompasses aspects such as, for example, the following.

(A) Turning Driving Device

The turning drive device to be controlled by the apparatus according to the present invention is not limited to the hydraulic type as described above. The turning drive device may include an electric turning motor. For example, there may be input a turning drive command signal to the turning motor from the actual machine controller 80 according to the embodiment. Alternatively, the turning drive device may include respective solenoid valves interposed between the pilot ports 34a, 34b of the turning control valve 34 and the pilot hydraulic source 38, in place of the turning operation device 36 shown in FIG. 2, and the turning command unit may be configured to input a turning drive command to the solenoid valve to control the pilot pressure input from the solenoid valve to the corresponding pilot port.

(B) Location of Each Element

Respective locations of the elements constituting the turning control apparatus according to the present invention are not limited. For example, the image display command unit 56 and the target stop position determination unit 58 of the remote operation system according to the embodiment may be included not in the remote operation controller 50 but in the actual machine controller 80. In this case, each sensor constituting the turning body information detecting device 60 may wirelessly transmit a detection signal to the image display command unit 56 and the target stop position determination unit 58 directly not through the communication path 100. Conversely, the braking required angle calculation unit 88 may be included in the remote operation controller 50. Besides, if having a transmitting function, the image taking device 72 can allow the image processing device 74 to be disposed in a remote operation station to form a target stop position setting image based on the data transmitted from the image taking device 72.

(C) Remote Operation

The turning control apparatus according to the present invention is not limited to one that is remotely operated through a remote operation system, such as the hydraulic excavator 10, but can also be applied to a turning-type working machine that is directly operated by an operator boarding in a cab. In such an aspect of direct operation, the position setting member, the image display device, the image display command unit, the target stop position determination unit and the like may be mounted on the working machine together with the turning drive device. Also in the aspect of direct operation, the turning operation member disposed in the vicinity of an operator's seat of a working machine can serve as a position setting member. In this case, it is preferable that a command switching unit switchable between a target stop position setting mode and a turning operation mode (corresponding to the remote operation mode) is mounted on the working machine, in place of the remote operation command unit 54 according to the embodiment, and the command switching unit is configured to make the target stop position determination unit determine a target stop position by use of the operation applied to the turning operation member as the position setting operation in the target stop position setting mode and configured to make the turning command unit output the turning drive command by use of the operation applied to the turning operation member as the turning operation in the turning operation mode.

(D) Position Setting Member and Position Setting Operation

The position setting member according to the present invention may be a member other than the turning operation member. For example, a position setting lever may be provided to the remote operation panel 40 separately from the remote turning operation lever 44. In a direct control system not being the remote operation system, there may be provided a position setting member separate from the turning operation member in the operator's cab of the working machine.

Besides, the position setting operation for setting the target stop position is not limited to an operation similar to the actual turning operation. For example, if the position setting member forms a push button of a press switch, it is possible that the turning of the turning virtual image is started by a pressing operation applied to the push button and the target stop position is determined at the time when the second pressing operation is applied. Alternatively, there may be provided a button switch for setting the target stop position on the handle portion of the turning operation lever. Alternatively, the determination of the target stop position may be performed on the condition that the operator operates the turning operation lever while pressing the position setting switch.

Various modes are also conceivable for releasing the setting of the target stop position. For example, the target stop position may be maintained until the application of an operation for setting release to the setting operation member or a member other than the setting operation member, or the target stop position may be released at the time when the lower travelling body starts travelling. Alternatively, it is also possible that, at the time when the position of the surrounding object is changed, the target stop position is released and an image to prompt the setting of a new target stop position is displayed on the image display device.

(E) Mode switching

In the case where the command switching unit in the present invention (the remote operation command unit 54 in the embodiment) has a target stop position setting mode and the turning operation mode (the remote operation mode in the embodiment), how the modes are switched can be freely set. For example, the target stop position setting mode may be maintained until the mode switch is further operated, even if the setting of the target stop position is completed in the target stop position setting mode. Alternatively, the turning operation mode may be switched to the target stop position setting mode when a predetermined operation is applied to the turning operation member while the target stop position is not set.

(F) Automatic Stop Control

For the automatic stop control based on the target stop position, there are various aspects. For example, the turning command unit may be configured to automatically control the driving of the turning body from the start of the turning to the stop at the target stop position not by the operation of the normal turning operation lever but by the press of a predetermined turning start switch by the operator. Furthermore, it is also possible that a first target stop position and a second target stop position are set and a control of automatically reciprocating the turning body at predetermined time intervals between the first and second target stop positions is performed. Besides, when the position of the turning body at the start of the swing is already close to the target stop position than the braking start position, may be performed a control of arbitrarily stopping the turning body.

(G) Target Stop Position Setting Image

The turning virtual image included in the target stop position setting image according to the present invention does not have to have the same shape as the shape of the working device 14 as the turning virtual image 94 shown in FIG. 5. The turning virtual image only has to be an image that turns on the target stop position setting image similarly to the actual turning body to allow the target stop position to be set; for example, it may be a straight line extending in the turning radial direction from the center of turning center Os as indicated by the one-dot chain line Ls shown in FIG. 7.

Furthermore, the target stop position setting image does not absolutely have to include a turning virtual image. For example, it is also possible that the target stop position setting image is constituted by only an overhead view image, and the target stop position is set by the pressing operation applied to the display screen that displays the overhead view image, by an operator, at a position corresponding to the desired target stop position. Alternatively, it is also possible to display a turning angle scale indicating many turning angles so as to superimpose it on the overhead view image to allow an operator to apply an operation to the setting operation member to select the turning angle corresponding to the desired target stop position among the turning angles indicated by the turning angle scale.

The overhead view image constituting the target stop position setting image according to the present invention is not limited to one viewing down the working machine and its surrounding objects from directly above the working machine as shown in FIG. 5. The overhead view image may be, for example, an image viewed from obliquely above the working machine.

As described above, there is provided a turning control apparatus being capable of automatically stopping a turning body at a target stop position in a turning-type working machine, and allowing the target stop position to be accurately and easily set.

Provided is a turning control apparatus for controlling driving of a turning body in a working machine that includes the turning body, a support body that supports the turning body turnably, and a turning drive device that turns the turning body, the turning control apparatus comprising: a target stop position setting unit that sets a target stop position, which is a position at which the turning of the turning body is to be stopped; and a turning command unit that provides an automatic stop command for automatically stopping the turning body at the target stop position to the turning drive device. The target stop position setting unit includes: an image taking device that is mounted on the working machine and takes an image of the working machine and surroundings thereof; an image processing device that forms an overhead view image of the working machine and a surrounding object positioned around the working machine based on the image taken by the image taking device; an image display device including a display screen capable of displaying the overhead view image; an image display command unit that makes the display screen display a target stop position setting image including the overhead view image; a setting operation member to which a position setting operation for setting the target stop position based on the position of the image of the working machine and the surrounding object included in the overhead view image is applied; and a target stop position determination unit that determines the target stop position based on the position setting operation.

This turning control apparatus allows an operator to easily and accurately set the appropriate target stop position based on the target stop position setting image including the actual working machine and the surrounding object without actually moving the turning body having a large moment of inertia by performing the position setting operation of setting the target stop position of the turning body with reference to the position of the image of the working machine and the surrounding object included in the overhead view image created based on the image actually taken by the image taking device.

In the turning control apparatus, it is preferable that the image display command unit is configured to make an image further including a turning virtual image that turns on the overhead view image simulating the turning body be displayed on the display screen as the target stop position setting image, and the target stop position determination unit is configured to determine the target stop position based on the position of the turning virtual image with respect to the turning direction at the time when the position setting operation is applied to the setting operation member during the turning of the turning virtual image. The combination of the overhead view image and the turning virtual image allows an operator to set the target stop position with a simple task of only applying the position setting operation to the setting operation member at an appropriate timing while confirming the relative positional relationship between the turning virtual image and the surrounding object displayed in the overhead view image. Moreover, for setting the target stop position, required is only displaying the turning virtual image on the overhead view image, with no necessity of actually moving the turning body. This allows the operator to set the target stop position with the same sense as when turning the actual turning body and safely.

It is preferable that: the turning control apparatus further comprises a turning operation member to which a turning operation for turning the turning body is applied; the turning command unit is configured to provide a turning drive command for making the turning body perform a turning motion corresponding to the turning operation applied to the turning operation member to the turning drive device when the target stop position is not set and configured to provide an automatic stop command for making the turning body perform automatically stopping motion in preference to the turning operation to the turning drive device when the target stop position is set. The thus configured turning command unit enables the following two controls to be established: a control of making the turning body perform a motion reflecting the intention of the operator applying the turning operation to the turning operation member, and a control of safely stopping the turning body at the target stop position regardless of the turning operation.

For example, the turning control apparatus further comprises a turning body information detecting device that detects turning body information about a moment of inertia and a turning motion of the turning body, and a braking required angle calculation unit that calculates a braking required angle that is required from starting braking of the turning body to stopping the turning body based on the information detected by the turning body information detecting device, wherein the turning command unit is configured to provide the turning drive command to the turning drive device when a remaining angle from the current position of the turning body to the target stop position is greater than the braking required angle and configured to provide the automatic stop command to the turning drive device when the remaining angle is equal to or less than the braking required angle. Such control in consideration with the braking required angle as described above enables the inertial body to be automatically stopped at a non-excessive deceleration even when the turning body has a large moment of inertia.

The turning operation member may be a member separate from the setting operation member; however, it can serve also as the setting operation member. In this case, it is preferable that the turning control apparatus further comprises a command switching unit switchable between a target stop position setting mode of making the target stop position determination unit determine the target stop position with regarding the operation applied to the turning operation member as the position setting operation and a turning operation mode of making the turning command unit output the turning drive command to the turning command unit with regarding the operation applied to the turning operation member as the turning operation. The operation switching unit allows the operation applied to the same turning operation member to be reflected in the operation of the turning control apparatus as both the position setting operation and the turning operation.

The turning operation member can serve also as the setting operation member even in the mode where the image display command unit makes the image display device display an image including the overhead view image and the turning virtual image as the target stop position setting image. In this case, the command switching unit is preferably configured to make the image display command unit issue an image display command so as to start the turning of the turning virtual image in the target setting position setting image when a turning start operation in a direction in which the turning operation member moves away from the neutral position is applied to the turning operation member in the target stop position setting mode, and configured to make the target stop position determination unit determine the target stop position based on a position of the turning virtual image with respect to the turning direction at the time when a neutral position return operation of returning the turning operation member to the neutral position is applied to the turning operation member during the turning of the turning virtual image. Thus associating the turning start operation, the neutral position return operation applied to the turning operation member, the turning start of the turning virtual image and the determination of the target stop position with each other allows an operator to start the turning of the turning virtual image and set the target stop position in the same sense as the sense of actually operating the turning operation member to start and stop the turning of the turning body.

The turning operation member may be mounted on the working machine; however, it may be a remote operation member to which a remote turning operation is applied at a remote operation station away from the working machine. Specifically, it is preferable that the turning control apparatus further comprises a remote operation command unit that transmits a remote turning operation command corresponding to the remote turning operation applied to the remote operation member, and the turning command unit is configured to receive the remote turning operation command and inputs a turning drive command corresponding to the remote turning operation command to the turning drive device. In such a remote operation, with which it is more difficult for an operator to accurately stop the turning body to a desired position as compared with the case where the actual operation is performed by actually boarding the working machine, the setting of the target stop position with use of the target stop position setting image is more effective.

In this case, it is preferable that the setting operation member is provided at a position where the setting operation member is able to be operated by an operator in the remote operation station, and the image display device is provided at a position where the target stop position setting image displayed on a screen of the image display device is able to be visually recognized by an operator in the remote operation station. These allow the operator to set the target stop position with use of the setting operation member and the image display device at a remote operation station for performing the remote operation.

The turning drive device may include, for example, an actual machine operation member that allows an actual operation to be applied to the actual machine operation member in the working machine, and a turning hydraulic circuit that operates the turning body to turn in response to the actual operation applied to the actual machine operation member. In this case, the turning command unit preferably includes a real operation application mechanism mounted on the working machine so as to be able to apply the actual operation as the turning drive command to the actual machine operation member and a real turning operation command unit that receives the remote turning operation command transmitted from the remote operation command unit and inputs an actual turning operation command to the actual operation application mechanism so as to make the actual operation application mechanism apply the actual operation corresponding to the remote turning operation command to the actual operation member; this enables the remote operation to be performed by use of the remote operation member.

Also the remote operation member can serve as the setting operation member. Specifically, it is preferable that the remote operation command unit is configured to be switchable between a remote operation mode of transmitting a remote turning operation command corresponding to the remote turning operation applied to the remote operation member to input the remote turning operation command to the turning command unit and a target stop position setting mode of making the target stop position determination unit determine the target stop position with regarding the operation applied to the remote operation member as the position setting operation (in short, the remote operation command unit is preferably configured as the command switching unit).

Also in the aspect in which the image display command unit makes the image display device display the target stop position setting image including the turning virtual image, the remote operation member can serve as a setting operation member in the same manner as described above. Specifically, the remote operation command unit is preferably configured to cause the image display command unit to make the image display device display an image so as to start the turning of the turning virtual image in the target stop position setting image when a turning start operation in the direction in which the remote operation member moves away from the neutral position is applied to the remote operation member in the target stop position setting mode and configured to make the target stop position determination unit determine the target stop position on the basis of the position of the turning virtual image with respect to a turning direction of the turning virtual image at the time when a neutral position return operation of returning the turning operation member to the neutral position is applied to the turning operation member during the turning of the turning virtual image.

According to the present invention, provided is also a turning-type working machine comprising a turning body, a support body that turnably supports the turning body, a turning drive device that turns the turning body, a device that controls driving of the turning body performed by the turning drive device, the device being constituted by any of the above-described turning control apparatuses.

The invention claimed is:

1. A turning control apparatus for controlling driving of a turning body in a working machine that includes the turning body, a support body that supports the turning body turnably, and a turning drive device that turns the turning body, the turning control apparatus comprising:
 a target stop position setting unit that sets a target stop position, which is a position at which the turning of the turning body is to be stopped; and
 a turning command unit that provides an automatic stop command for automatically stopping the turning body at the target stop position to the turning drive device, wherein:
 the target stop position setting unit includes: an image taking device that is mounted on the working machine and takes an image of the working machine and surroundings thereof; an image processing device that forms an overhead view image of the working machine and a surrounding object positioned around the working machine based on the image taken by the image taking device; an image display device including a display screen capable of displaying the overhead view image; an image display command unit that makes the display screen display a target stop position setting image including the overhead view image; a setting operation member to which a position setting operation for setting the target stop position based on the position of the image of the working machine and the surrounding object included in the overhead view image is applied; and a target stop position determination unit that determines the target stop position based on the position setting operation, and
 the image display command unit is configured to make an image further including a turning virtual image that turns on the overhead view image simulating the turning body be displayed on the display screen as the target stop position setting image, and the target stop position determination unit is configured to determine the target stop position based on the position of the turning virtual image with respect to a turning direction of the turning virtual image at the time when the position setting operation is applied to the setting operation member during turning of the turning virtual image.

2. A turning-type working machine comprising:
 a turning body;
 a support body that turnably supports the turning body;
 a turning drive device that turns the turning body; and
 a turning control apparatus according to claim 1, the turning control apparatus controlling driving of the turning body performed by the turning drive device.

3. A turning control apparatus for controlling driving of a turning body in a working machine that includes the turning body, a support body that supports the turning body turnably, and a turning drive device that turns the turning body, the turning control apparatus comprising:
 a target stop position setting unit that sets a target stop position, which is a position at which the turning of the turning body is to be stopped;
 a turning command unit that provides an automatic stop command for automatically stopping the turning body at the target stop position to the turning drive device; and
 a turning operation member to which a turning operation for turning the turning body is applied, wherein:
 the target stop position setting unit includes: an image taking device that is mounted on the working machine and takes an image of the working machine and surroundings thereof; an image processing device that foiins an overhead view image of the working machine and a surrounding object positioned around the working machine based on the image taken by the image taking device; an image display device including a display screen capable of displaying the overhead view image; an image display command unit that makes the display screen display a target stop position setting image including the overhead view image; a setting operation member to which a position setting operation for setting the target stop position based on the position of the image of the working machine and the surrounding object included in the overhead view image is applied; and a target stop position determination unit that determines the target stop position based on the position setting operation,
 the turning command unit is configured to provide a turning drive command for making the turning body perform a turning motion corresponding to the turning operation applied to the turning operation member to the turning drive device when the target stop position is not set and configured to provide an automatic stop command for making the turning body perform automatically stopping motion in preference to the turning operation to the turning drive device when the target stop position is set, and
 the turning operation member serves as the setting operation member, and the turning control apparatus further comprises a command switching unit switchable between a target stop position setting mode of making the target stop position determination unit deteiniine the target stop position with regarding the operation applied to the turning operation member as the position setting operation and a turning operation mode of making the turning command unit output the turning drive command to the turning command unit with regarding the operation applied to the turning operation member as the turning operation.

4. The turning control apparatus according to claim 3, wherein: the image display command unit is configured to make an image further including a turning virtual image that turns on the overhead view image simulating the turning body be displayed on the display screen as the target stop position setting image; the target stop position determination unit is configured to determine the target stop position based on the position of the turning virtual image with respect to a turning direction of the turning virtual image at the time when the position setting operation is applied to the setting operation member during turning of the turning virtual image; and the command switching unit is configured to make the image display command unit issue an image display command so as to start the turning of the turning virtual image in the overhead view image when a turning start operation in a direction in which the turning operation member moves away from the neutral position is applied to the turning operation member in the target stop position setting mode and configured to make the target stop position determination unit determine the target stop position based on a position of the turning virtual image with respect to the turning direction at the time when a neutral position return operation of returning the turning operation member to the neutral position is applied to the turning operation member during the turning of the turning virtual image.

5. The turning control apparatus according to claim 3, wherein the turning operation member is a remote operation member to which a remote turning operation is applied at a remote operation station away from the working machine, the turning control apparatus further comprising a remote operation command unit that transmits a remote turning operation command corresponding to the remote turning operation applied to the remote operation member, the turning command unit being configured to receive the remote turning operation command and to input a turning drive command corresponding to the remote turning operation command to the turning drive device.

6. The turning control apparatus according to claim 5, wherein the setting operation member is provided at a position where the setting operation member is able to be operated by an operator in the remote operation station, and the image display device is provided at a position where the target stop position setting image displayed on a screen of the image display device is able to be visually recognized by an operator in the remote operation station.

7. The turning control apparatus according to claim 5, wherein: the turning drive device includes an actual machine operation member that allows an actual operation to be applied to the actual machine operation member in the working machine, and a turning hydraulic circuit that operates the turning body to turn in response to the actual operation applied to the actual machine operation member; and the turning command unit includes a real operation application mechanism mounted on the working machine so as to be able to apply the actual operation as the turning drive command to the actual machine operation member and a real turning operation command unit that receives the remote turning operation command transmitted from the remote operation command unit and inputs an actual turning operation command to the actual operation application mechanism so as to make the actual operation application mechanism apply the actual operation corresponding to the remote turning operation command to the actual operation member.

8. The turning control apparatus according to claim 5, wherein: the remote operation member serves as the setting operation member, and the remote operation command unit is configured to be switchable between a remote operation mode of transmitting a remote turning operation command corresponding to the remote turning operation applied to the remote operation member to input the remote turning operation command to the turning command unit and a target stop position setting mode of making the target stop position determination unit determine the target stop position with regarding the operation applied to the remote operation member as the position setting operation.

9. The turning control apparatus according to claim 8, wherein: the image display command unit makes the image display device display the target stop position setting image including the turning virtual image; the target stop position determination unit is configured to determine the target stop position based on the position of the turning virtual image with respect to the turning direction at the time when the position setting operation is applied to the setting operation member during the turning of the turning virtual image; and the remote operation command unit is configured to cause the image display command unit to make the image display device display an image so as to start the turning of the turning virtual image in the target setting position setting image when a turning start operation in the direction in which the remote operation member moves away from the neutral position is applied to the remote operation member in the target stop position setting mode and configured to make the target stop position determination unit determine the target stop position on the basis of the position of the turning virtual image with respect to a turning direction of the turning virtual image at the time when a neutral position return operation of returning the turning operation member to the neutral position is applied to the turning operation member during the turning of the turning virtual image.

10. A turning-type working machine comprising:
a turning body;
a support body that turnably supports the turning body;
a turning drive device that turns the turning body; and
a turning control apparatus according to claim 3, the turning control apparatus controlling driving of the turning body performed by the turning drive device.

\* \* \* \* \*